(12) United States Patent
Boisvert et al.

(10) Patent No.: US 6,968,093 B1
(45) Date of Patent: Nov. 22, 2005

(54) PIXEL PROCESSING SYSTEM FOR IMAGE SCANNING APPLICATIONS

(75) Inventors: David M. Boisvert, Windham, NH (US); Joseph D. Clark, Hudson, NH (US); Robert James LeBoeuf II, Salem, NH (US); Andrew Kenneth John McMahon, Santa Clara, CA (US); Michael Joseph Maigret, Santa Clara, CA (US)

(73) Assignee: Eastman Kodak Company, Rochester, NY (US)

( * ) Notice: Subject to any disclaimer, the term of this patent is extended or adjusted under 35 U.S.C. 154(b) by 669 days.

(21) Appl. No.: 09/957,946

(22) Filed: Sep. 20, 2001

(51) Int. Cl.$^7$ .............................................. G06K 9/38
(52) U.S. Cl. ....................... 382/270; 382/312; 382/318
(58) Field of Search ................. 348/238, 246, 348/627, 234, 254, 253, 241, 272; 382/273, 382/240, 248, 173, 232, 233, 270, 312, 318; 358/446, 474, 514

(56) References Cited

U.S. PATENT DOCUMENTS

| | | | |
|---|---|---|---|
| 4,962,419 A * | 10/1990 | Hibbard et al. ............. | 348/627 |
| 5,008,739 A * | 4/1991 | D'Luna et al. ............. | 348/246 |
| 5,291,307 A * | 3/1994 | Luckhurst ................... | 358/446 |
| 6,342,919 B2 | 1/2002 | Opris ......................... | 348/241 |
| 6,801,667 B1 * | 10/2004 | Lindquist ................... | 382/240 |
| 6,816,942 B2 * | 11/2004 | Okada et al. ............... | 711/112 |

FOREIGN PATENT DOCUMENTS

EP 0926887 * 6/1999 ............ H04N 5/20

OTHER PUBLICATIONS

Reynolds et al., "An Integrated 12 Bit Analog Front end for CCD Based Image Processing Applications", IEEE, Jun. 1996, pps. 96-97.*
Thomas et al., "Signal Calibration and Stability in an Uncooled Integrated Bolometer Array", IEEE vol. 3, Mar. 1999, pps. 401-409.*

* cited by examiner

Primary Examiner—Anh Hong Do
(74) Attorney, Agent, or Firm—Peyton C. Watkins

(57) ABSTRACT

A linear pixel-array processing systems uses a combination of digital and analog signal processing techniques to calibrate the gain and offset of each pixel in the analog domain. A plurality of fixed gain and offset values are applied in the analog domain to adjust the gain and offset of each pixel at high speeds (on the order of 25–50 MHz). By adjusting the gain and offset in the analog domain, the dynamic range of pixel conversion is improved such that the conversion range is fully utilized (over 90%, on the order of 95%–99%). The gain and offset values are determined with an algorithmic calibration routine that corrects for non-ideal effects in the signal path. A single processing channel can be multiplexed to process multiple pixel arrays to provide for a cost effective solution. In higher speed systems, the single processing channel can be extended to multiple processing channels for improved throughput.

31 Claims, 10 Drawing Sheets

PIXEL PROCESSING SYSTEM FOR IMAGE SCANNING APPLICATIONS

FIELD OF THE INVENTION

The present invention relates generally to linear pixel-array processing systems. More particularly, the present invention relates to an apparatus and method that uses a combination of digital and analog signal processing techniques to calibrate the gain and offset of each pixel in a linear pixel-array.

BACKGROUND OF THE INVENTION

Photosensitive semiconductor devices such as photodiodes or charge-coupled devices (CCDs) are widely used to convert images of visible light into electronic signals. These devices divide an image into a large number of discrete cells or pixels that are arranged in a number of rows (lines). Each pixel converts incident light into a packet of electrons. The number of electrons in the packet represents the intensity level of the incident light on the pixel. The electron packets are transferred to an output port in a line-by-line format. The electron packets for each line are dumped, pixel-by-pixel, onto an output diode, thereby forming an output signal that has a number of pixel periods.

The voltage across the diode is related to the intensity level of incident light on the pixel. Each pixel also has a corresponding black level. The black level for each pixel corresponds to the voltage that is present across the output diode when no light is incident on the pixel. The black level varies over operating temperature as well as between different lots of pixels.

In order to capture an image, the intensity level of the incident light on the pixel is captured and quantized into a digital code. A conventional image processor quantizes a first digital code corresponding to the black level, and a second digital code corresponding to the illuminated image. The difference between the two quantized codes corresponds to the intensity level of the image.

SUMMARY OF THE INVENTION

A linear pixel-array processing systems uses a combination of digital and analog signal processing techniques to calibrate the gain and offset of each pixel in the analog domain. A plurality of fixed gain and offset values are applied in the analog domain to adjust the gain and offset of each pixel at high speeds (on the order of 25–50 MHz). By adjusting the gain and offset in the analog domain, the dynamic range of pixel conversion is improved such that the conversion range is fully utilized (over 90%, on the order of 95%–99%). The gain and offset values are determined with an algorithmic calibration routine that corrects for non-ideal effects in the signal path. A single processing channel can be multiplexed to process multiple pixel arrays to provide for a cost effective solution. In higher speed systems, the single processing channel can be extended to multiple processing channels for improved throughput.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on".

Figure 1:
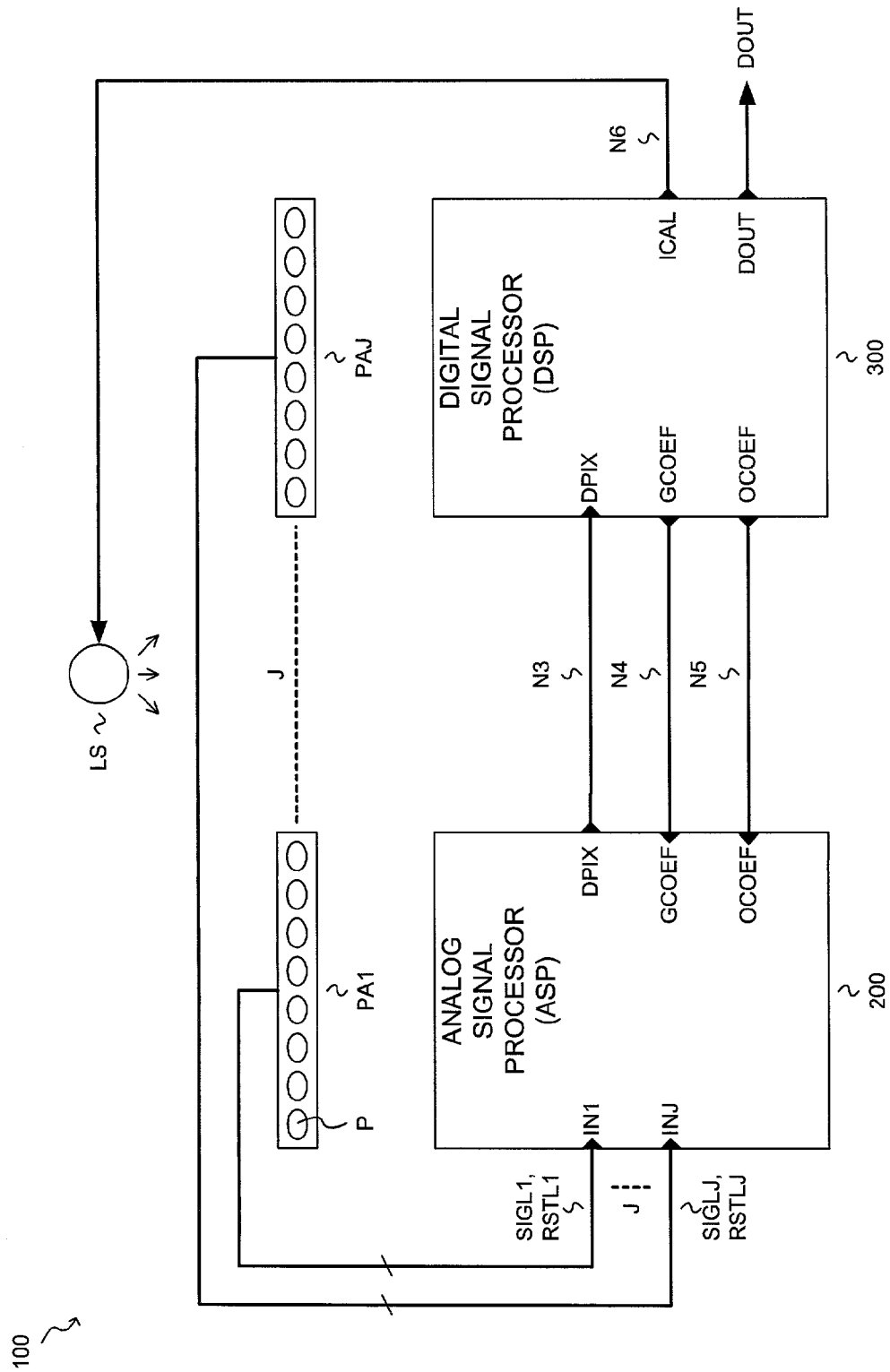
FIG. 1 is a schematic diagram illustrating an exemplary scanning system.

FIG. 1 is a schematic diagram of an exemplary scanning system (100) that includes the present invention. The scanning system includes a lights source (LS), an array (J) of linear pixel arrays (PA1–PAJ), an analog signal processor (ASP, 200), and a digital signal processor (DSP, 300). Each linear pixel array includes an array of pixels (P) that are arranged in a single line.

Each pixel array (PA1–PAJ) provides a differential output signal that corresponds to a difference in potential between SIGL and RSTL (e.g., SIGL1, RSL1, . . . , SIGLJ, RSTLJ). The differential output signal sequentially corresponds to each pixel (e.g. P) in the associated linear pixel array (e.g. PA1). The differential output signals are provided as inputs to ASP 200, which in turn provides a digital data output (DPIX) to node N3. DPIX corresponds to the conversion codes for each pixel in the linear pixel arrays. DPIX can either be a serial stream of individual bits or a bus including complete conversion codes. ASP 200 converts the differential signals from the pixel arrays to digital codes utilizing a gain scaling coefficient (GCOEF) and an offset coefficient (OCOEF), which are provided by DSP 300. DSP 300 receives the data (DPIX) from ASP 200. Light source LS receives a calibrated timing signal (ICAL) from DSP 300. DSP 300 provides a digital data output signal (DOUT) during scanning. Although GCOEF and OCOEF are illustrated as separate signals, DSP 300 may combine GCOEF and OCOEF into a single data-word that is provided on a digital data bus. Additional timing signals (not shown) are utilized by the pixel arrays, ASP 200 and DSP 300.

As shown in FIG. 1, the signal processing of the scanned pixels are provided by a combination of analog and digital signal processing means (ASP 200, DSP 300). ASP 200 and DSP 300 include a calibration operating mode and a scanning operation mode. During the calibration mode, DSP 300 processed multiple scans of digital data DPIX and calculates the gain and offset coefficients (GCOEF, OCOEF). DSP 300 also calibrates the light source (LS), such that light source LS is enabled long enough to provide proper illumination of the pixel arrays to maximize the dynamic range in the conversion of each pixel to its corresponding digital code. ICAL, GCOEF, and OCOEF work together to maximize the conversion range as will be described in further detail below.

The pixel-arrays are operated in two pixel periods, a reset period and an illumination period. During the reset period the diodes in the pixel arrays are reset to a reset signal level. Following reset, the pixel-arrays are illuminated by the light source such that the diodes in each pixel integrate in proportion to the intensity level of the illumination. Each pixel transforms the received light energy into a charge that is then transferred sequentially onto the output diode of the pixel array. This charge transfer displaces the voltage level of the output diode from the initial reset signal level to a data signal level.

When uniform white light shines on the pixel array, the electron packets formed within the pixels should each have the same number of electrons. In actual practice, however, each pixel converts light into electrons at different efficiencies. Also, other non-photon based sources may create offsets in each pixel. An exemplary non-photon based source is a thermally generated charge that is inherent in each pixel array. In the present invention, the non-photon based offsets are measured by calibrating the pixels to a black level when no illumination is applied. The amount of light energy that is received by a pixel is determined by the difference between the reset signal level and the data signal level as offset by a calibrated amount.

The present invention illustrated in FIG. 1 adjusts the offset levels and the gain levels for each pixel in the analog domain such that the analog-to-digital conversion of each pixel has improved dynamic range. By using the full range in analog-to-digital conversion, improved contrast is obtained in the captured image with reduced noise.

Analog Signal Processor (ASP)

Figure 2:
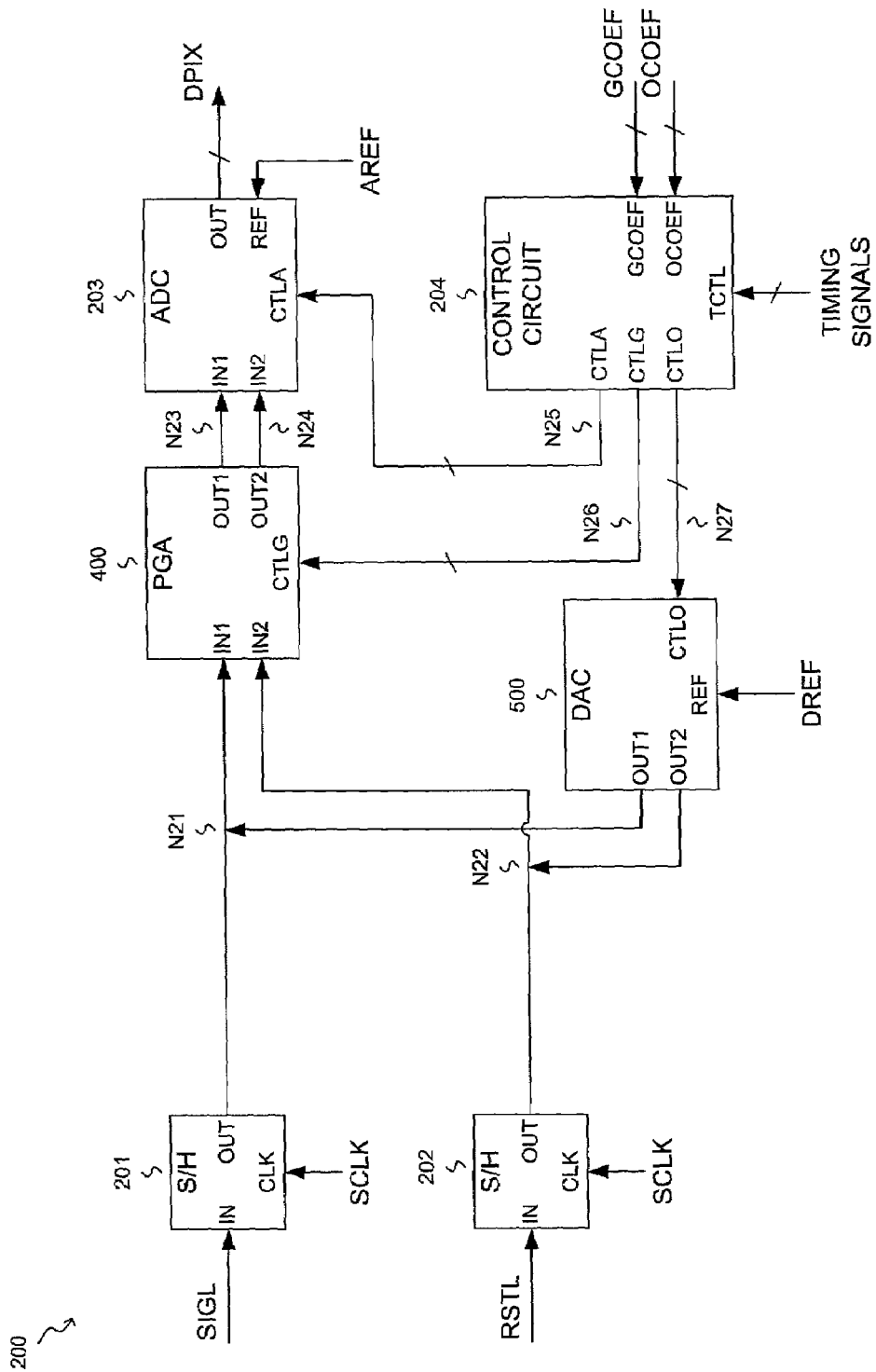
FIG. 2 is a schematic diagram illustrating an exemplary analog signal processor (ASP)

FIG. 2 is a detailed schematic of an exemplary analog signal processor (ASP 200) that is in accordance with the present invention. ASP 200 includes two sample and hold circuits (S/H 201, S/H 202), a programmable gain amplifier (PGA 400), an analog-to-digital converter (ADC 203), a digital-to-analog converter (DAC 500), and a control circuit (204).

Control circuit 204 receives coefficient signals GCOEF and OCOEF from DSP 300 as previously described. Additional timing signals (TIMING SIGNALS) are provided to control circuit 204 to allow synchronization of the adjustment of the gain and offset coefficients with DSP 300. Control circuit 204 provides timing and control signals CTLA, CTLG, and CTLO at nodes N25–N27 in response to TIMING SIGNALS, OCOEF, and GCOEF. The signals at node N25 corresponds to the timing and control signals for ADC 203, while the signals at nodes N26 and N27 correspond to the timing and control signals for PGA 400 and DAC 500 respectively.

In operation, differential signals are provided to ASP 200 by pixel arrays PA1–PAJ. Each pixel array provides a differential signal that has a signal level portion (SIGL) and a reset (or reference) level portion (RSTL). S/H 201 samples the signal level portion (SIGL) of the differential signal in response to a sampling clock signal (SCLK). S/H 202 samples the reset level portion (RSTL) of the differential signal in response to the sampling clock signal (SCLK). The sampled versions of SIGL and RSTL are provided to node N21 and node N22 respectively.

DAC 500 provides an offset signal to nodes N21 and N22 in response to CTLO and digital reference levels (DREF). PGA 400 receives the offset signal and the sampled version of the differential signal from nodes N21 and N22. The timing and control of DAC 500 are synchronized with the timing and control of PGA 400 such that PGA 400 provides gain to the sampled versions of the differential signal after adjusting the offset of the incoming signals. PGA 400 provides a differential output signal at nodes N23 and N24 that corresponds to the offset corrected, and gain adjusted pixel signal.

ADC 203 receives the differential signal from nodes N23 and N24, an analog reference signals (AREF), and timing and control signals (CTLA) from node N25. ADC 203 quantizes the received differential signal and provides a digital output (DPIX) to DSP 300 (See FIG. 1). The digital output of ADC 203 may be a serial data output or a parallel data output.

DAC 500 operates as a programmable offset generator that adjusts the offset of the received signals in the analog domain. As discussed previously, offset may result from thermal activity in the pixel arrays as well as other non-photonic effects. DAC 500 is provided with control signals CTLO that are synchronized in time with the receipt of the pixel array signals such that the offset for each pixel is adjusted in the analog domain. The resolution of DAC 500 may be any resolution that is necessary for offset adjustment. In one example, DAC 500 has an 8-bit conversion range. The resolution of DAC 500 is unrelated to the resolution of PGA 400 and ADC 203. DAC 500 is preferably implemented as a high-speed, differential output, switched capacitor type circuit. Alternatively, other high-speed circuits that are arranged to provide a programmable offset at the pixel rate may be employed.

Figure 5:
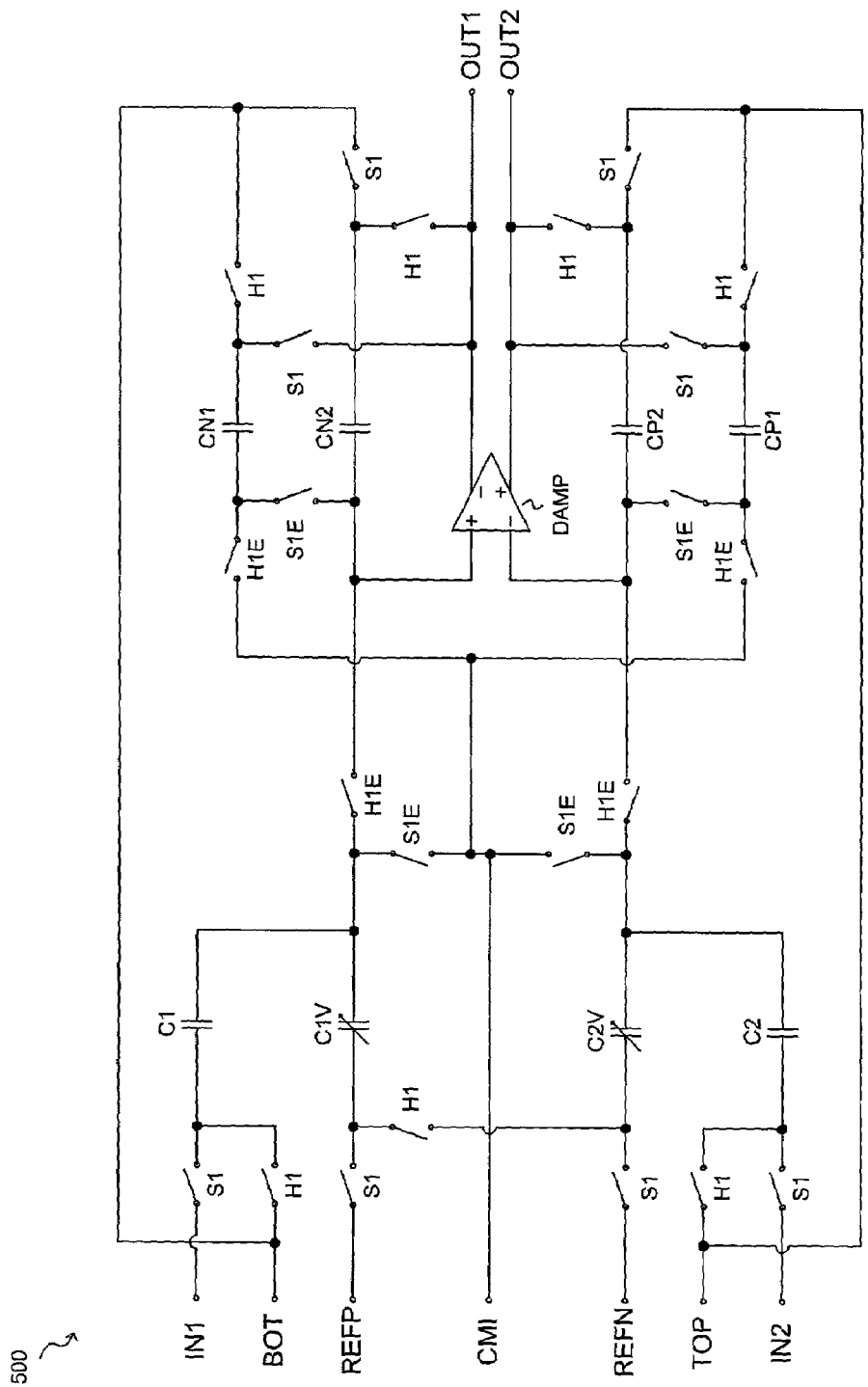
FIG. 5 is a schematic diagram of an exemplary digital-to-analog converter (DAC)

An exemplary DAC using switched capacitor techniques is illustrated in FIG. 5. Capacitors C1V and C2V are adjusted in value in response to a control signal (not shown) to control the amount of offset introduced by the DAC (500). Each of the switches is actuated in response to one of control signals (H1, S1, H1E, and S1E) as labeled in the schematic. A common-mode input voltage level is supplied to CMI during operation. Capacitor values for C1, C1V, CN1 and CN2 determine the scaling of the DAC from IN1 to OUT1, while capacitor values for C2, C2V, CP1, and CP2 determine the scaling of the DAC from IN2 to OUT2. When capacitors C1=C2, C1V=C2V, CN1=CP1, and CN2=CP2, the scaling from IN1 to OUT1 and IN2 to OUT2 are equal to one another. During a sampling phase, switches S1 and S1E are closed, while switches H1 and H1E are open. Capacitors C1 and C2 sample the input signals from IN1 and IN2 respectively, while capacitors C1V and C2V sample REFP and REFN respectively. Also capacitors CP1, CP2 and CN1, CN2 are initialized to TOP and BOT respectively during the sample phase. During a hold phase, switches H1 and H1E are closed, while switches S1 and S1E are open. Charges stored on capacitors during the sample phase are transferred such that IN1 and IN2 are offset adjusted.

PGA 400 is employed to adjust the gain of the offset adjusted signals in the analog domain. As discussed previously, the white intensity level of each pixel may be different from one another. PGA 400 is provided with control signals CTLG that are synchronized in time with the receipt of the pixel array signals such that the gain for each pixel is adjusted in the analog domain. The resolution of PGA 400 may be any resolution that is necessary for gain adjustment. In one example, PGA 400 has a 9-bit gain adjustment. The resolution of PGA 400 is unrelated to the resolution of DAC 500 and ADC 203. PGA 400 is preferably implemented as a high-speed, differential output, switched capacitor type circuit that operates at the pixel rate. One example of a switched capacitor type amplifier is disclosed in U.S. Pat. No. 5,703,524 to Chen, which is hereby incorporated by reference.

Figure 4:
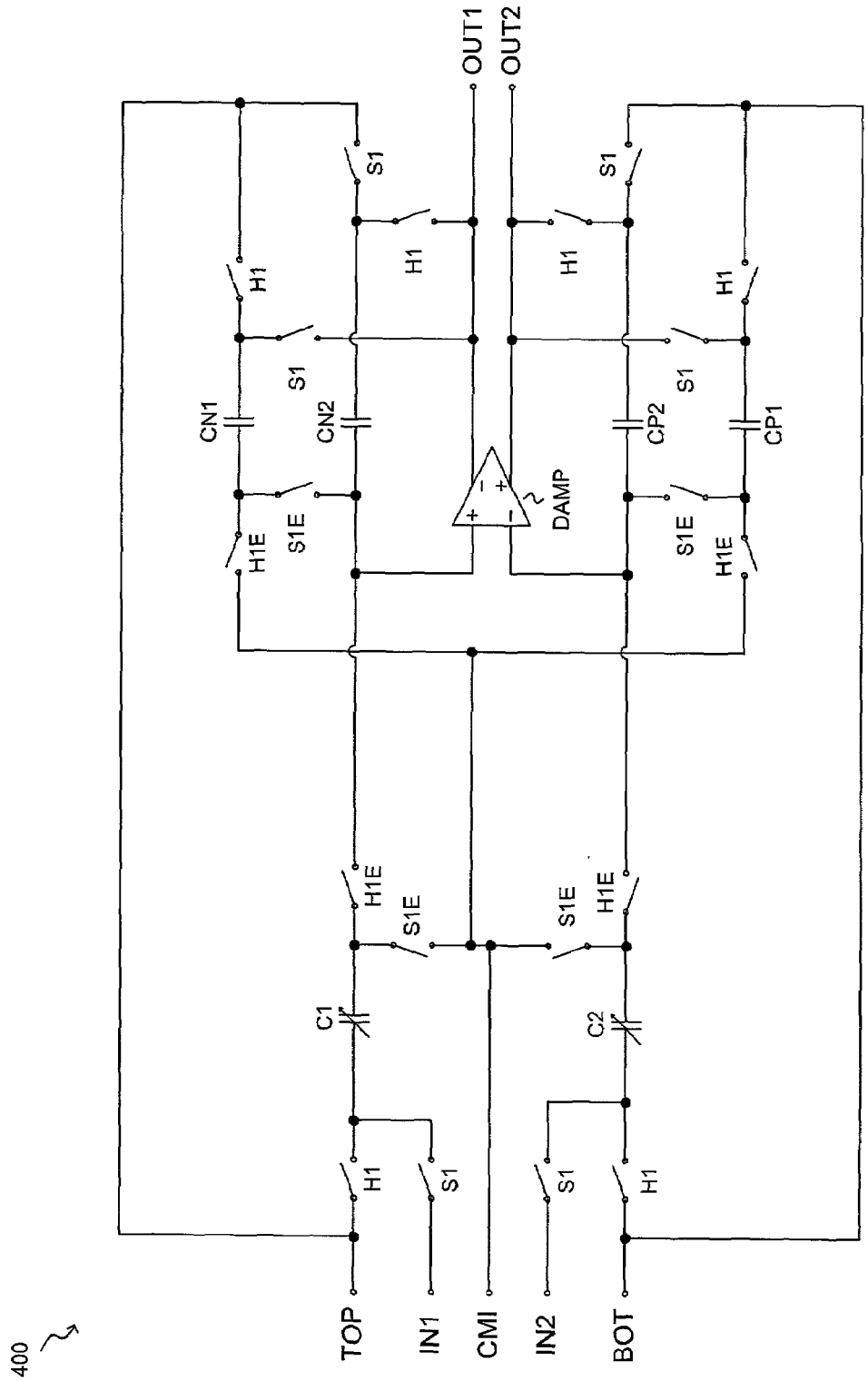
FIG. 4 is a schematic diagram illustrating an exemplary programmable gain amplifier (PGA)

An exemplary PGA using switched capacitor techniques is illustrated in FIG. 4. Capacitors C1 and C2 are adjusted in value in response to a control signal (not shown). Each of the switches is actuated in response to one of control signals (H1, S1, H1E, and S1E) as labeled in the schematic. A common-mode input voltage level is supplied to CMI during operation. Capacitor values for C1, CN1 and CN2 determine the gain of the amplifier from IN1 to OUT1, while capacitor values for C2, CP1, and CP2 determine the gain of the amplifier from IN2 to OUT2. When capacitors C1=C2, CN1=CP1, and CN2=CP2, the gains from IN1 to OUT1 and IN2 to OUT2 are equal to one another. During a sampling phase, switches S1 and S1E are closed, while switches H1 and H1E are open. Capacitors C1 and C2 sample the input signals from IN1 and IN2 respectively, while capacitors CP1, CP2 and CN1, CN2 are initialized to TOP and BOT respectively. During a hold phase, switches H1 and H1E are closed, while switches S1 and S1E are open. Charges stored on capacitors during the sample phase are transferred such that IN1 and IN2 are gain adjusted.

In a flatbed scanner type of image scanning system, pixel arrays are arranged in row (or line). In operation, scanning is accomplished by illuminated the image with the light source and either moving the image relative to the pixel arrays, or moving the pixel arrays relative to the image, so that the entire image is scanned. Bar-code scanners as well as other scanning applications operate similarly. In these scanning applications, each pixel array is read out pixel-by pixel such that ASP 200 receives a serial stream of pixel data.

When multiple pixel arrays are utilized, such as in FIG. 1, ASP 200 requires additional circuitry to accommodate the array (J) of differential signal inputs that are provided by the pixel arrays (PA1–PAJ). In this case, S/H 201 and S/H 202 each include an array of sample-and-hold circuits that are arranged to sample each of the differential signals from the pixel arrays (PA1–PAJ). In one example, the output of each sample-and-hold circuit is coupled to a multiplexer (MUX) that is arranged to select one of the outputs from S/H 201 and another output from S/H 202. In another example, each of the sample-hold circuits is coupled to a separate DAC, PGA, and ADC that are arranged as illustrated in FIG. 2. Other circuit arrangements that combine multiple differential signal inputs with the above-described ASP are within the scope of the present invention.

Digital Signal Processor (DSP)

Figure 3:
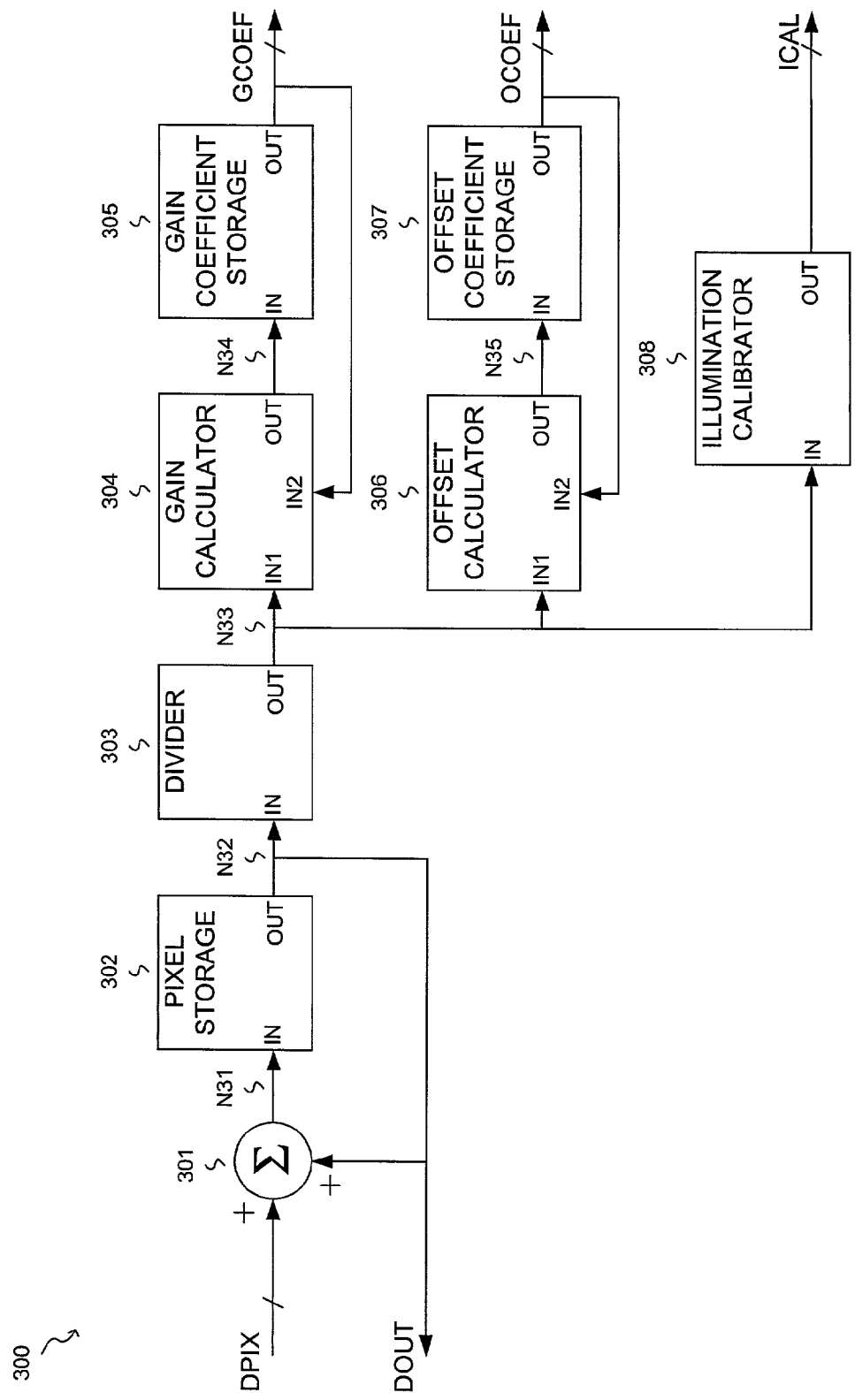
FIG. 3 is a schematic diagram illustrating an exemplary digital signal processor (DSP)

FIG. 3 is a detailed schematic of an exemplary digital signal processor (DSP 300) that is in accordance with the present invention. DSP 300 includes an accumulator (301), a pixel storage (302), a divider (303), a gain calculator (304), a gain coefficient storage (305), an offset calculator (306), an offset coefficient storage (307), and an illumination calibrator (308). A timing generator circuit (not shown) that is used to generate timing signal used by ASP 200 and DSP 300 may optionally be included in DSP 300.

DSP 300 includes a calibration mode and a scanning mode. The calibration mode further includes several sub-modes. A first sub-mode is used for calibrating the illumination time of light source LS. A second sub-mode is used for determining the gain coefficients. A third sub-mode is used for determining the offset coefficients.

DSP 300 calculates gain, offset and illumination coefficients during the calibration mode. During calibration mode, at least one line is scanned using the pixel arrays. ASP 200 provides quantized signals to DSP 300 via DPIX as previously described. At each instant of time, DPIX corresponds a single pixel in a pixel array. Accumulator 301 receives one signal (DPIX) from ASP 200, and retrieves another signal from node N32. Pixel storage 302 provides a signal to node N32 by retrieving a previous history of the current pixel associated with DPIX. Accumulator 301 adds the two signals together and provides an output signal at node N31. Pixel storage 302 stores the accumulated signal from node N31 in a storage location and provides the next pixel storage location to node N32. After all of the scans are complete, pixel storage 302 is accessed and each accumulated signal is provided to divider 303 at node N32. Divider N32 divides the accumulated signal by the number of scans performed to provide an average signal at node N33. The average signal at node N33 is received by one of the gain calculator, the offset calculator and the illumination calibrator depending on the sub-mode that is selected.

In one alternative embodiment, the accumulator and divider are eliminated and the system processes a single scan line without the use of averaging. In another alternative embodiment, the accumulator and divider are part of a processor such as a microprocessor or a digital signal processor. In yet another embodiment, an additional function block receives DPIX and preprocesses the data prior to passing the processed data to the accumulator.

In the first sub-mode, the illumination calibrator (308) calculates an appropriate on time for the light source to provide proper illumination of an image. In the second sub-mode, the Gain calculator 304 provides gain coefficients to node N34 using a first algorithmic determination. In the third sub-mode, the offset calculator 306 provides offset coefficients to node N35 using a second algorithmic determination. Gain coefficient storage 305 received gain coefficients from node N34 and stores the coefficients for later retrieval as GCOEF. Offset coefficient storage 307 receives offset coefficients from node N35 and stores the coefficients for later retrieval as OCOEF.

The first and second algorithms utilize previously determined gain and offset coefficients together with processed information corresponding to each pixel received from DPIX during a corresponding sub-mode. In one example, the algorithms are a simple determination of the peak signal received from DPIX in the corresponding sub-mode. In another example, the algorithms correspond to a statistical calculation is calculated over multiple scans. Example statistical calculations that may be employed include mean, median, standard deviation, as well as applications of probability and estimation theories.

During the scanning mode, the previously stored gain and offset coefficients (GCOEF, OCOEF) corresponding to the next pixel to be scanned are retrieved from gain coefficient storage 305 and offset coefficient storage 307 respectively. Gain coefficient GCOEF and offset coefficient OCOEF are provided to ASP 200 by DSP 300. Also, the illumination calibrator activates light source LS for an appropriate on time using the ICAL signal. As the ASP provides additional DPIX to DSP 300, accumulator 301 passes the incoming signals to pixel storage 302 without modification. Pixel storage 302 stores the received signals.

After scanning of a line is complete, the stored pixel data may be retrieved from the pixel storage as DOUT. Pixel storage 302 may be implemented as multiple line buffers such that one line buffer is written to while the other line buffer is read out. Additional circuitry may also be provided to rearrange the stored pixel data for readout. For example, a data serializer may be employed to provide a serial data output instead of a parallel output. Also, the pixels may be reordered into a left-right or right-left reordering scheme when necessary to provide a proper orientation of adjacent pixels to one another.

The gain and offset coefficient storage circuits (305, 307) may be implemented as combined memory storage or separate memory storage areas. The gain and offset coefficients may be stored in pairs in adjacent storage locations or combined for a single storage location.

Multiple color planes are utilized in color scanning applications. In one example, a red, green, and blue color plane is utilized and separate gain and offset coefficients are determined for each of the color planes. The gain and offset coefficient storage (306, 307) may be organized into separate memory storage locations for each color plane, or one memory storage that is partitioned into separate areas for each color planes coefficients.

Further details concerning the algorithms and procedures employed by DSP 300 will be discussed in further detail with reference to FIGS. 6–10.

General Procedural Flow

Figure 6:
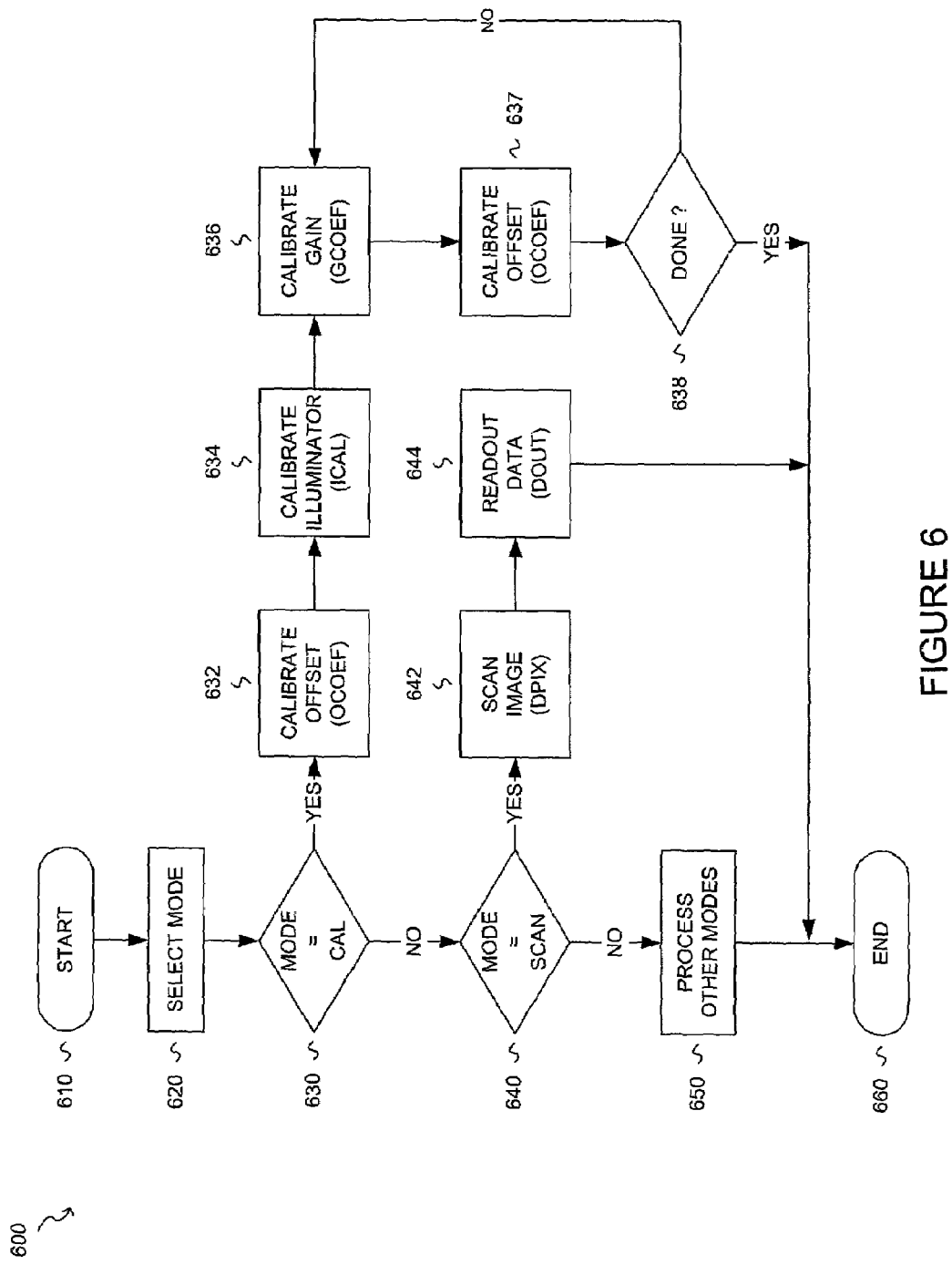
FIG. 6 is an exemplary procedural flow diagram.

FIG. 6 is a procedural flow chart (600) of an exemplary embodiment of the invention. The procedural steps may be performed in specially designed electronic circuits, a general purpose or embedded processor such as a microprocessor, or a combination of electronic circuits and a processor.

Processing begins at block 610 (START). Flowing to block 620 (SELECT MODE), the operating mode for the system is selected. The selection of operation may be accomplished by any means including an initialization sequence, automatically selected randomly, automatically selected periodically, and user actuated. Proceeding to decision block 630, the system analyzes the selected mode (MODE). Processing flows to block 632 when the selected mode (MODE) is a calibration mode (CAL). Alternatively, processing flows from decision block 630 to decision block 640 when the selected mode (MODE) is not the calibration mode (CAL). Proceeding to decision block 640, the system analyzes the selected mode (MODE). Processing proceeds from block 640 to block 642 when the selected mode (MODE) is a scanning mode (SCAN). Alternatively processing flows from decision block 640 to block 650 when the selected mode (MODE) is not the scanning mode (SCAN).

At block 632 (CALIBRATE OFFSET) the offset coefficients (OCOEF) are calculated for each of the pixels in the array. Processing flows from block 632 to block 634 (CALIBRATE ILLUMINATOR), where the light source is calibrated for a proper on time. The ICAL coefficient is determined based on this calculation. Processing flows from block 634 to block 636 (CALIBRATE GAIN), where the gain coefficients (GCOEF) for each of the pixels in the array are calculated. Processing flows from block 636 to block 637 (CALIBRATE OFFSET), where the offset coefficients (OCOEF) are recalculated for each of the pixels in the array. The offset coefficients are adjusted to account for the illumination time and the gain coefficients. Proceeding to decision block 638 (DONE?), the system determines if the gain and offset calculations are complete. Processing flows from block 638 to block 660 (END) where processing is terminated when the calibration is complete. Alternatively, processing returns to block 636 flows from block 638, where the gain and offset coefficients are recalculated.

At block 642 (SCAN IMAGE) the light source is activated and an image is scanned line-by-line. As the image is scanned a stream of data (DPIX) is received and stored in a memory such as that found in DSP 300 as previously discussed. Processing flows from block 642 to block 644 (READOUT DATA), where the stored data is provided as an output (DOUT). Optionally, the data may be reorganized for readout such as serial data, right-left organized data, and left-right organized data as may be desired. Flowing from block 634 to block 660 (END), processing is terminated.

In one embodiment, decision block 638 repeatedly evaluates the gain and offset coefficients from blocks 636 and 637 to determine when a solution is converged upon. In another embodiment, the gain and offset coefficients are recalculated a fixed number of times. Other examples are also within the scope of the invention.

Calibrate Illuminator Procedural Flow

Figure 7:
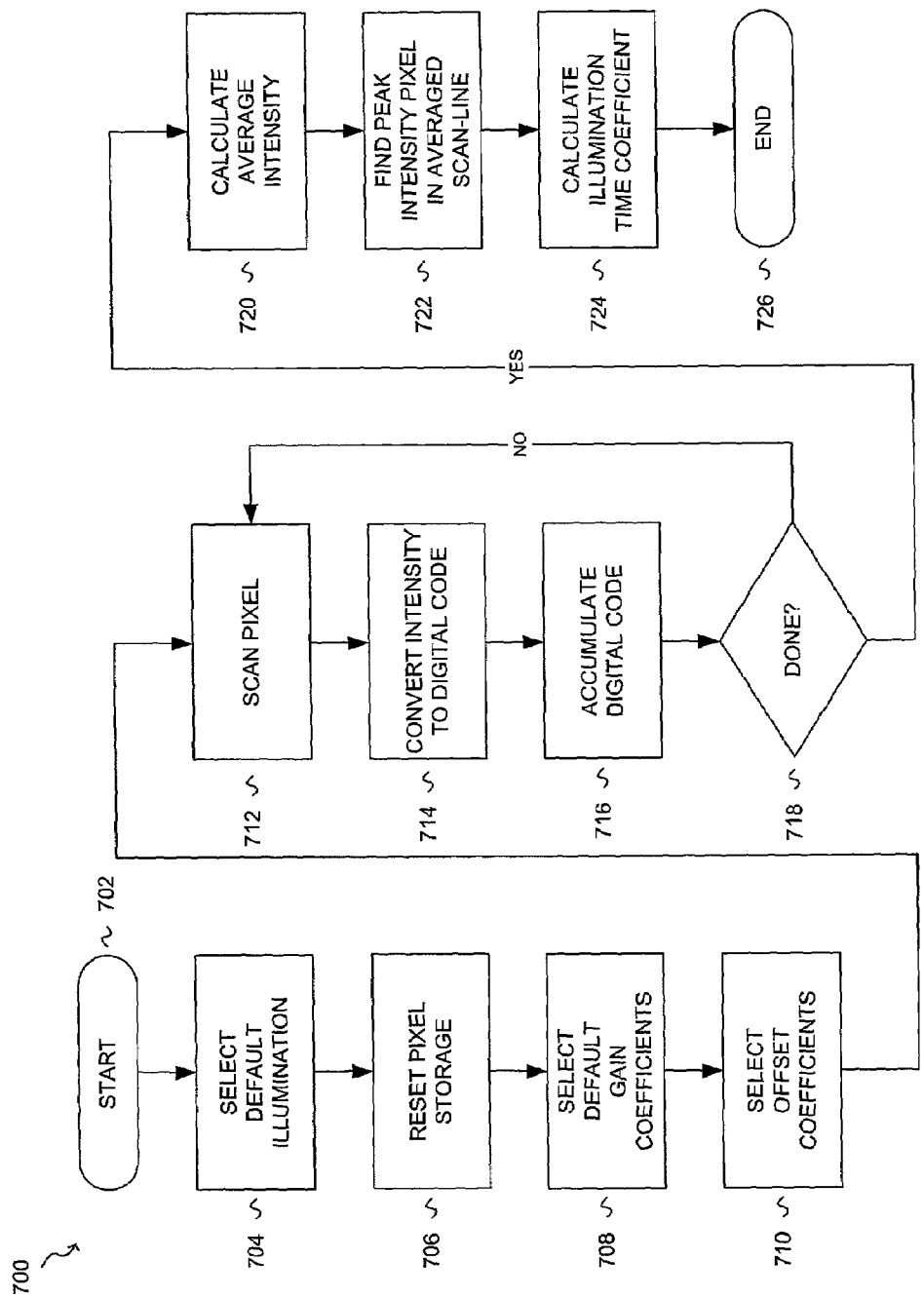
FIG. 7 is an exemplary flow diagram for the illumination calibration procedure.

FIG. 7 is a procedural flow chart of an exemplary illuminator calibration sequence (700) that is in accordance with the present invention. Processing begins at block 702 (START). Flowing to block 704 (SELECT DEFUALT ILLUMINATION), the illumination time of the light source is initialized to a default condition (Tinit). Processing flows to block 706 (RESET PIXEL STORAGE), where the pixel storage is initialized to a default condition (i.e. cleared to zero). Processing flows to block 708 (SELECT DEFAULT GAIN COEFFICIENTS), where the gain coefficients (GCOEF) are initialized to a default condition. Processing continues to block 710 (SELECT OFFSET COEFFICIENTS), where the previously calculated offset coefficients (OCOEF) are selected. Processing flows from block 710 to block 712 (SCAN PIXEL), where a scanning procedure is initiated.

In one example, the gain coefficients (GCOEF) are initialized in block 708 to a gain of one (unity). In another example, the offset coefficients (OCOEF) are initialized in block 710 to a maximum setting on a DAC such as DAC 500 previously described above. In still another example, the gain and offset coefficients are initialized in blocks 708 and 710 by the first set of scanned pixel data that is received from the conversion from block 714 (see below).

At block 712 scanning of a line is commenced such that the light source is activated for the default illumination time and differential signals from pixel arrays are provided to an analog processor such as ASP 200. For each scanned pixel, processing continues to block 714 (CONVERT INTENSITY TO DIGITAL CODE), where the analog processor, using the previously selected gain and offset coefficients, processes each received differential signal to provide a digital code to a digital signal processor such as DSP 300. Processing flows to block 716 (ACCUMULATE DIGITAL CODE) where a previously stored code corresponding to the current pixel is retrieved and added to the current code. The accumulated code is stored for later processing. Proceeding to decision block 718 (DONE?) the system determines if all of pixels have been scanned. Processing flows from block 718 to block 712, when the system is not done processing each of the scanned pixels. Alternatively, processing flows from block 718 to 720 when the scanning operations are complete. In one example, 64 scans are performed before completion.

At block 720 (CALCULATE AVERAGE INTENSITY), the stored accumulations for each pixel are averaged. Averaging is accomplished for each pixel by dividing the accumulated digital code for each pixel by the number of scans. Continuing to block 722 (FIND PEAK INTENSITY PIXEL IN AVERAGED SCAN LINE), the system searches all of the averaged pixels to determine which pixel has the highest intensity level (PixelMax). Processing continues to block 724 (CALCULATE ILLUMINATION TIME COEFFICIENT), where the illumination time is determined for the light source. Processing flows from block 724 to block 726 (END), where processing is terminated.

The magnitude of the differential signals received by the analog signal processor is dependent on the luminosity of the light and the duration for which each pixel has been exposed. To maximize the dynamic range of the pixel array, the illuminator is turned on for a period of time such that the most efficient pixel in the array only just saturates when the light from the light source is reflected from a white subject. The illumination time (Ton) calculated by the following equation:

$$Ton = Tinit \times \frac{TargetWhite}{PixelMax}$$

TargetWhite is the upper target intensity level for a white pixel value, PixelMax is the highest intensity level of the averaged line of pixels, and Tinit is the default initialized on time for the light source. Alternatively, the peak intensity level can be determined from another calculation such as standard deviation, variance, mean, median, as well as others. A single scan system may be employed to determine the peak intensity level without the use of averaging for each pixel.

Calibrate Offset Procedural Flow

Figure 8:
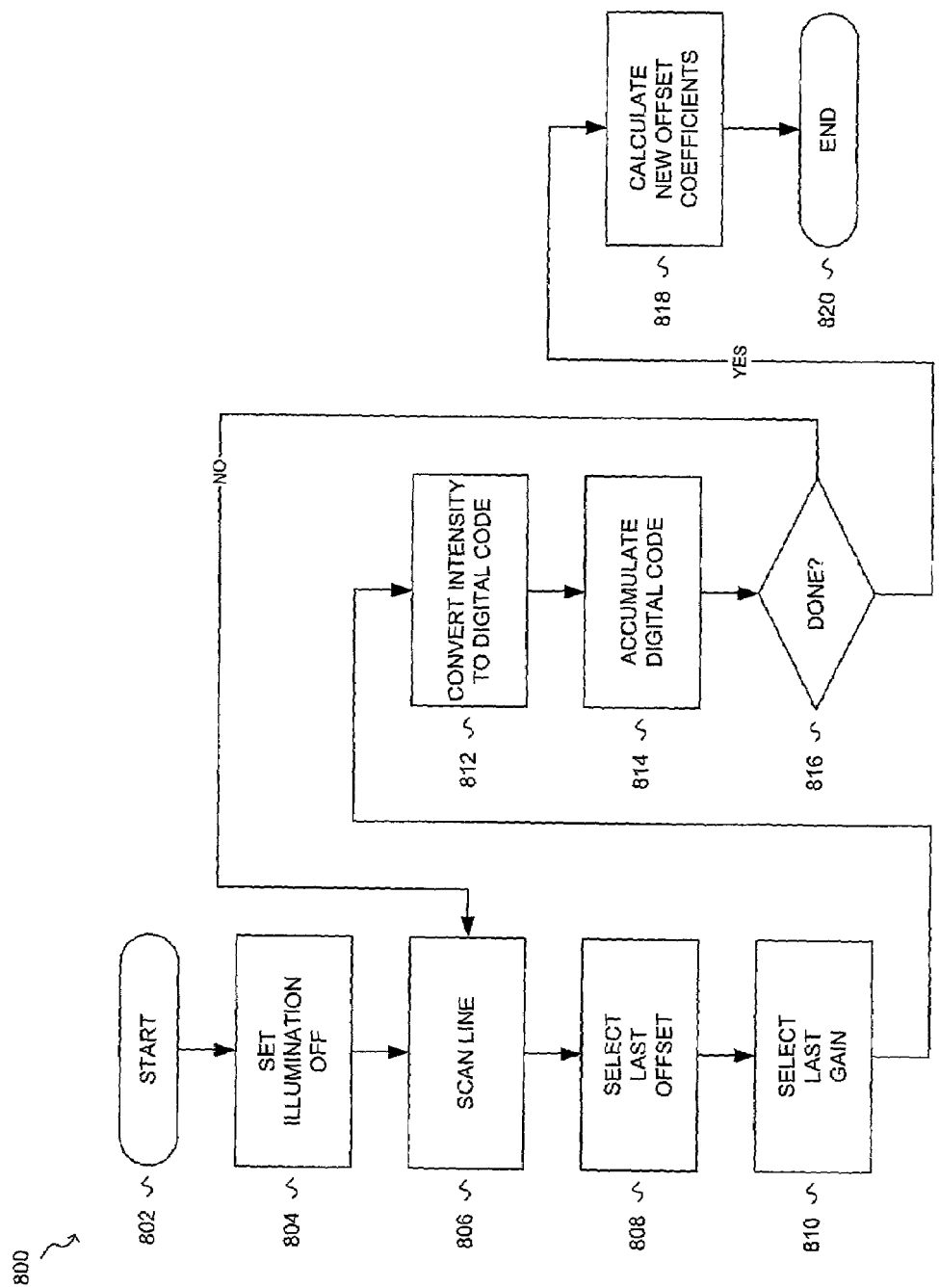
FIG. 8 is an exemplary flow diagram for the offset calibration procedure.
Figure 9:
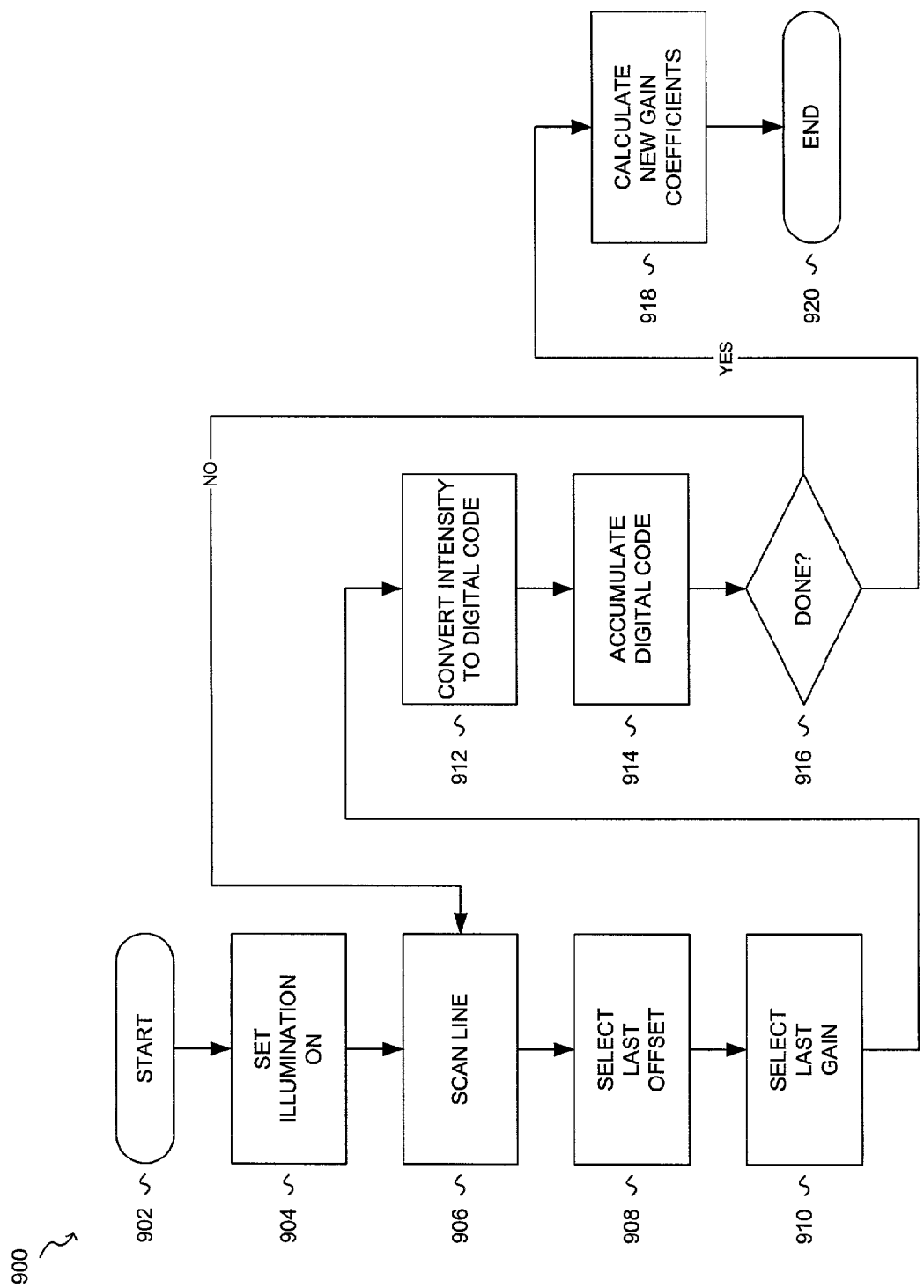
FIG. 9 is an exemplary flow diagram for the gain calibration procedure.

FIG. 8 is a procedural flow chart of an exemplary offset calibration sequence (800) that is in accordance with the present invention. Processing begins at block 802 (START). Proceeding to block 804 (SET ILLUMINATION OFF), the light source is deactivated. Continuing to block 806 (SCAN LINE), scanning of the differential signals from the pixel arrays is commenced. Each pixel is processed according to procedural blocks 808–816 as described below.

Proceeding to block 808 (SELECT LAST OFFSET), the last stored offset coefficient (OCOEF) for the current pixel is selected. Processing continues to block 810 (SELECT LAST GAIN), where the last stored gain coefficient (GCOEF) for the current pixel is selected. Continuing to block 812 (CONVERT INTENSITY TO DIGITAL CODE), the differential signal received from each pixel is converted into a digital code using the applied gain and offset coefficients (GCOEF, OCOEF). Proceeding to block 814 (ACCUMULATE DIGITAL CODE), the current digital code is added to the previously stored digital codes for the current pixel. The accumulated digital code is stored for later processing. Continuing to decision block 816 (DONE?), the system determines if scanning is complete. Processing continues back to block 806 for further scanning when scanning is not complete. Alternatively, processing continues to block 818 (CALCULATE NEW OFFSET COEFFICIENTS) when scanning is complete. Processing terminates at block 820.

At block 818 new offset coefficients are calculated. For each pixel, an average pixel intensity level (Pixel) is calculated that corresponds to a black level. The average is determined by dividing the accumulated digital code for each pixel by the number of scans performed. In one example, 64 scans of each pixel in the array are performed to compute the average black level. The average offset coefficient (OCOEF) is determined as by the following equation:

$$OCOEF = OCOEF(Z^{-1}) + [(TargetBlack - Pixel) \times Io]$$

TargetBlack is the target intensity level for a black pixel value, Pixel is the intensity level of the averaged pixel, $OCOEF(Z^{-1})$ is the previously calculated offset value, and Io is the integration scaling factor. The integration-scaling factor is used to dampen the convergence of offset values.

In some systems with limited memory and/or limited resolution, a dithering scheme can be used to assist in convergence. A dithering scheme can be accomplished by rounding up or down to the nearest integer. In one example, when (TargetBlack-Pixel)*Io is negative, the quantity is rounded down to the nearest integer. In another example, when (TargetBlack-Pixel)*Io is positive, the quantity is rounded up to the nearest integer.

In the example described above, an average is calculated as an example of the determination of offset coefficients. Offset coefficients may be determined by another appropriate calculation such as standard deviation, variance, mean, median, or another calculation that employs one or more scans of each pixel in the array.

Calibrate Gain Procedural Flow

FIG. 8 is a procedural flow chart of an exemplary gain calibration sequence (900) that is in accordance with the present invention. Processing begins at block 902 (START). Proceeding to block 904 (SET ILLUMINATION ON), the light source is activated. Continuing to block 906 (SCAN LINE), scanning of the differential signals from the pixel arrays is commenced. Each pixel is processed according to procedural blocks 908–916 as described below.

Proceeding to block 908 (SELECT LAST OFFSET), the last stored offset coefficient (OCOEF) for the current pixel is selected. Processing continues to block 910 (SELECT LAST GAIN), where the last stored gain coefficient (GCOEF) for the current pixel is selected. Continuing to block 912 (CONVERT INTENSITY TO DIGITAL CODE), the differential signal received from each pixel is converted into a digital code using the applied gain and offset coefficients (GCOEF, OCOEF). Proceeding to block 914 (ACCUMULATE DIGITAL CODE), the current digital code is added to the previously stored digital codes for the current pixel. The accumulated digital code is stored for later processing. Continuing to decision block 916 (DONE?), the system determines if scanning is complete. Processing continues back to block 906 for further scanning when scanning is not complete. Alternatively, processing continues to block 918 (CALCULATE NEW GAIN COEFFICIENTS) when scanning is complete. Processing terminates at block 920.

At block 918 new gain coefficients are calculated. For each pixel, an average pixel intensity level (Pixel) is calculated that corresponds to a white level. The average is determined by dividing the accumulated digital code for each pixel by the number of scans performed. In one example, 64 scans of each pixel in the array are performed to compute the average black level. In another example a single scan is performed.

Gain Calculation Procedural Flow

Figure 10:
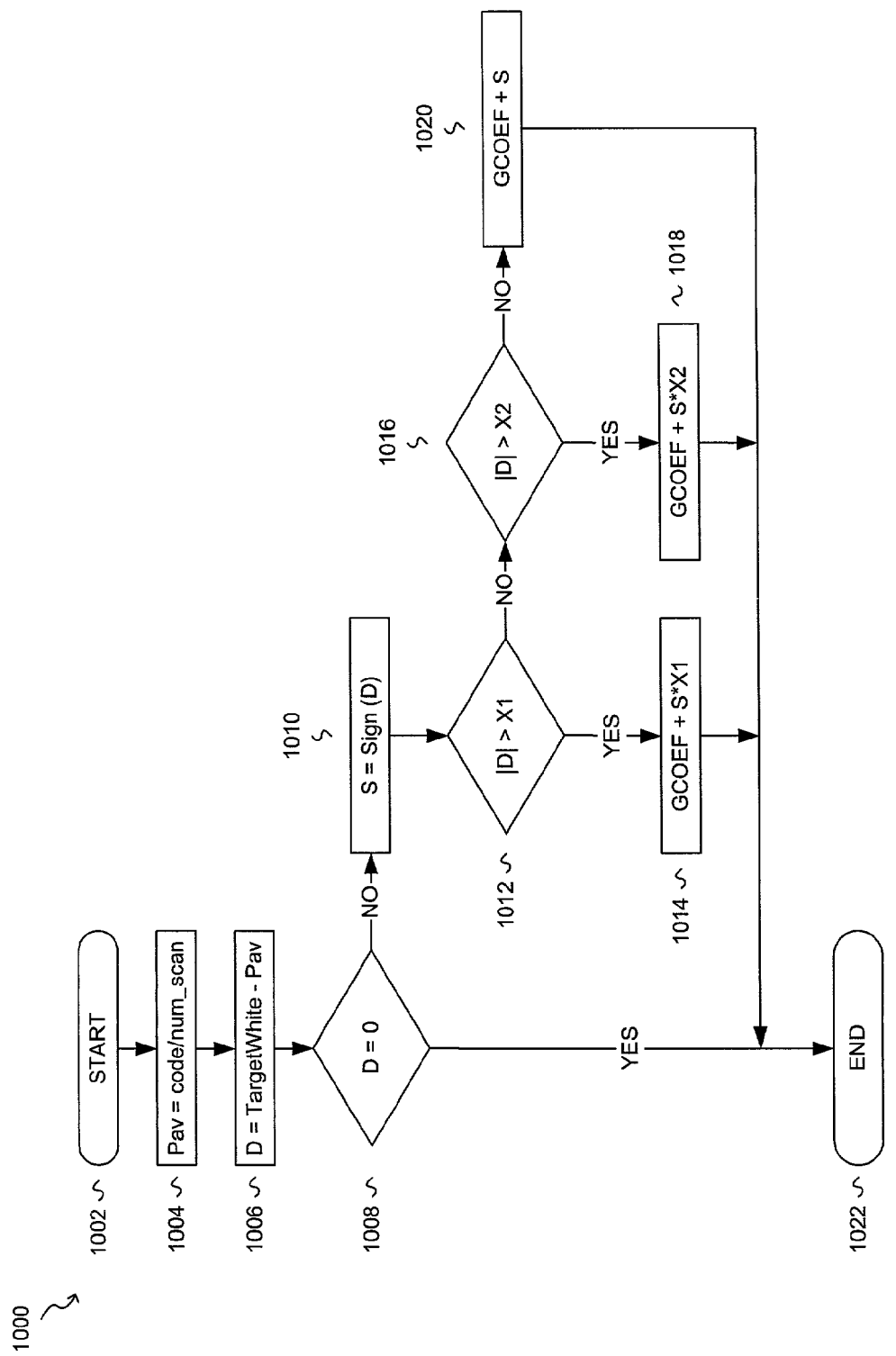
FIG. 10 is an exemplary flow diagram for the gain calculation, in accordance with the present invention.

FIG. 10 is a procedural flow chart of an exemplary gain calculation (1000) that is in accordance with the present invention. Processing begins at block 1002 (START). Proceeding to block 1004, the average pixel intensity level is calculated as: Pav=code/num_scan, where code is the accumulated conversion code, and num_scan is the number of scans performed. Processing proceeds to block 1006, where the difference (D) between the average intensity level (Pav) and a target white level is determined as D=TargetWhite−Pav. Processing continues to decision block 1008 where D is compared to zero. Processing continues from block 1008 to block 1022 (END) when the comparison yields zero, where processing is terminated. Alternatively, processing flows from block 1008 to block 1010 when D is different from zero.

Proceeding to block 1010, a sign coefficient (S) is determined from the sign of D. At block 1012, the magnitude of the difference is compared to a first threshold level X1. Processing flows from block 1012 to block 1014 when |D|>X1. At block 1014, a new gain coefficient is derived by adding S*X1 to the current gain coefficient. Thus, when sign S is positive, the gain coefficient is incremented by X1, and when sign S is negative, the gain coefficient is decremented by X1. Processing flows from block 1014 to block 1022 where processing is terminated.

Returning to block 1012, processing flows to decision block 1016 when |D| is not greater than the first threshold (X1). At block 1016, the magnitude of the difference is compared to a second threshold level X2. Processing flows from block 1016 to block 1018 when |D|>X2. At block 1018, a new gain coefficient is determined by adding S*X2 to the current gain coefficient. Thus, when sign S is positive, the gain coefficient is incremented by X2, and when sign S is negative, the gain coefficient is decremented by X2. Processing flows from block 1018 to block 1022 where processing is terminated.

Returning to block 1016, processing flows to block 1020 when |D| is not greater than X2. At block 1020, a new gain coefficient is determined by adding S to the current gain coefficient. Thus, when sign S is positive, the gain coefficient is incremented by 1 (a terminal amount), and when sign S is negative, the gain coefficient is decremented by 1 (a terminal amount). Processing flows from block 1020 to block 1022 where processing is terminated.

Each gain coefficient (GCOEF) is determined using an algorithm that attempts to adjust the white level of each pixel so that the digital code output (e.g., DPIX out of ASP 200) just reaches saturation for every pixel in the pixel arrays. The decision is based on how far away each pixel (DPIX) is from the target value. Although the above-described procedure includes two threshold levels, any number of threshold levels may be used. In one example, three threshold levels are used corresponding to PGA codes of 64, 32, and 4; yielding increment/decrement values of 64, 32, 4, and 1.

Non-equal increment/decrement levels may be employed such that the algorithm increases more rapidly than it decreases. Also, the threshold levels in the positive and negative direction may be non-equidistant from the zero difference level. The gain coefficients can be determined using a binary search algorithm, or any other appropriate algorithm. The increment/decrement amounts may be either integer or non-integer based amounts. Similarly, the thresholds levels may be integer or non-integer based amounts.

The above-described system utilizes a plurality of fixed gain and offset values that are applied in the analog domain to adjust the gain and offset of pixels at high speeds (on the order of 25–50 MHz). By adjusting the gain and offset in the analog domain, the dynamic range of pixel conversion is improved such that the conversion range is fully utilized (over 90%, on the order of 95%–99%). The gain and offset values are determined with an algorithmic calibration routine that corrects for non-ideal effects in the signal path. A single processing channel can be multiplexed to process multiple pixel arrays to provide for a cost effective solution. In higher speed systems, the single processing channel can be extended to multiple processing channels for improved throughput.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An image processing system that receives a stream of pixel signals from a pixel array that is selectively illuminated by a light source, the system comprising:
  an analog signal processor that is arranged to receive the stream of pixel signals, produce adjusted pixel signals by adjusting a gain and an offset of each pixel, and convert the adjusted pixel signals to digital pixel signals, wherein the analog signal processor comprises:
    a programmable offset generator circuit that is configured to provide an adjusted offset signal by introducing the offset to each pixel signal, wherein the offset is determined by an offset coefficient such that each pixel in the pixel array has a corresponding offset coefficient; and
    a programmable gain amplifier that is arranged to receive the adjusted offset signal and provide the adjusted pixel signal by adjusting the gain in each adjusted offset signal, wherein the gain is determined by a gain coefficient such that each pixel in the pixel array has a corresponding gain coefficient; and
  a digital signal processor that is configured to receive the digital pixel signals and provide the gain coefficient and the offset coefficient to the analog signal processor such that the analog signal processor provides adjustment to the gain and the offset of each pixel signal in the analog domain, wherein a dynamic range associated with the conversion of the adjusted pixel signals to the digital pixel signals is enhanced on a pixel-by-pixel basis.

2. A system as in claim 1, wherein the programmable offset generator is a digital-to-analog converter (DAC) that is arranged to provide the offsets to each pixel signal in response to the offset coefficients.

3. A system as in claim 1, wherein the programmable gain amplifier is a switched capacitor circuit.

4. A system as in claim 1, the analog signal processor further comprising a sample-and-hold circuit that is arranged to periodically sample the stream of pixel input signals and produce sampled pixel signals.

5. A system as in claim 1, the analog signal processor further comprising an array of J sample-and-hold circuits that are coupled to the pixel array, wherein the pixel array includes an array of J pixel array segments, each of the sample-and-hold circuits is arranged to periodically sample the stream of pixel input signals from a different one of the pixel array segments and produce sampled pixel signals.

6. A system as in claim 5, the analog signal processor further comprising a multiplexer that is arranged to selectively couple each of the sampled pixel signals from the array of J sample-and-hold circuits to the programmable gain amplifier and the programmable offset generator such that each sampled pixel signal is processed at a different time interval.

7. A system as in claim 1, further comprising an analog-to-digital converter that is arranged to receive the adjusted pixel signal and provide the digital pixel signals by quantizing the adjusted pixel signal, wherein the analog-to-digital converter has a conversion range, and the adjusted pixel signals utilize the full conversion range.

8. A system as in claim 7, wherein the adjusted pixel signals use at least 90% of the conversion range.

9. A system as in claim 7, wherein the adjusted pixel signals use at least 95% of the conversion range.

10. A system as in claim 1, the digital signal processor further comprising a pixel storage that is arranged to store the stream of digital pixel signals when the system is in a scanning mode such that digital pixel signals that corresponds to a complete scan-line of an illuminated image is stored in the pixel storage for later retrieval.

11. A system as in claim 1, the digital signal processor further comprising a gain calculator that is arranged to determine the gain coefficient associated with a selected pixel in response to digital codes associated with the selected pixel.

12. A system as in claim 1, the digital signal processor further comprising an offset calculator that is arranged to determine the offset coefficient associated with a selected pixel in response to digital codes associated with the selected pixel.

13. A system as in claim 1, the digital signal processor further comprising an illumination calibrator that is arranged to determine the illumination time of the light source in response to the digital codes associated with each pixel in the pixel array.

14. A method for processing an image that is scanned using a pixel array that is selectively illuminated by a light source, the method comprising:
receiving a stream of pixel signals from the pixel array;
calculating a gain coefficient and an offset coefficient according to a first process and a second process, respectively;
retrieving the gain coefficient and the offset coefficient corresponding to each pixel in the pixel array;
providing an offset to the pixel signals in the analog domain, wherein the offset for each pixel in the pixel array is determined by the corresponding offset coefficient;
providing a gain to the pixel signals in the analog domain, wherein the gain for each pixel in the pixel array is determined by the corresponding gain coefficient, and wherein the gain is provided separately from the offset; and
converting the gain and offset adjusted pixel signals to digital pixel signals.

15. A method as in claim 14, wherein calculating the offset coefficients according to the first process utilizes the digital pixel signals.

16. A method as in claim 15, wherein the light source is disabled during the first process.

17. A method as in claim 16, further comprising calculating new offset coefficients (OCOEF) from old offset coefficients (OCOEF*$Z^{-1}$) and the intensity (Pixel) associated with each pixel.

18. A method as in claim 14, wherein calculating the gain coefficients according to the second process utilizes the digital pixel signals.

19. A method as in claim 18, further comprising activating the light source for a predetermined time interval when the gain coefficients are calculated.

20. A method as in claim 18, the second process further comprising:
calculating a difference between a target white intensity level and the intensity level associated with each pixel in the pixel array;
increasing the gain coefficient by a first amount when the difference is greater than a first threshold level;
increasing the gain coefficient by a second amount when the difference is greater than a second threshold level and less than or equal to the first threshold level;
decreasing the gain coefficient by a third amount when the difference is less than zero and the absolute value of the difference is greater than a third threshold level; and
decreasing the gain coefficient by a fourth amount when the difference is less than zero and the absolute value of the difference is greater than a fourth threshold level and less than or equal to the third threshold level.

21. A method as in claim 20, wherein the first amount and the third amount are the same as one another, and wherein the second amount and the fourth amount are the same as one another.

22. A method as in claim 20, the second process further comprising:
increasing the gain coefficient by a terminal amount when the difference is less than or equal to the second threshold level; and
decreasing the gain coefficient by another terminal amount when the difference is less than zero and the absolute value of the difference is less than or equal to the fourth threshold level.

23. A method as in claim 14, wherein the light source has an associated illumination time that is determined according to a third process that utilizes the digital pixel signals.

24. A method as in claim 23, the third process comprising:
initializing a pixel storage at the start of a calibration mode;
initiating a scanning procedure during the calibration mode;
retrieving a first signal from the pixel storage during the scanning procedure, wherein the first signal is associated with a selected pixel in the pixel array and the corresponding digital pixel signal;
calculating a second signal with the first signal and the corresponding digital pixel signal; and
storing the second signal in the pixel storage, wherein the second signal corresponds to a pixel intensity for the selected pixel.

25. A method as in claim 24, further comprising:
selecting a default illumination time (Tinit) for the light source, default offset coefficients, and default gain coefficients at the start of the third process;
finding a peak pixel intensity (PixelMax) from the pixel storage; and
calculating an illumination time coefficient (Ton) from the peak pixel intensity (PixelMax) and a target white signal level (TargetWhite).

26. A method as in claim 25, wherein the illumination time coefficient is determined by $$Ton = Tinit \times \frac{TargetWhite}{PixelMax}.$$

27. A method for processing an image that is scanned using a pixel array that is selectively illuminated by a light source, the method comprising:
- receiving a stream of pixel signals from the pixel array;
- determining a gain coefficient and an offset coefficient;
- calculating a difference between a target white intensity level and the intensity level associated with each pixel in the pixel array;
- increasing the gain coefficient by a first amount when the difference is greater than a first threshold level;
- increasing the gain coefficient by a second amount when the difference is greater than a second threshold level and less than or equal to the first threshold level;
- decreasing the gain coefficient by a third amount when the difference is less than zero and the absolute value of the difference is greater than a third threshold level;
- decreasing the gain coefficient by a fourth amount when the difference is less than zero and the absolute value of the difference is greater than a fourth threshold level and less than or equal to the third threshold level;
- retrieving the gain coefficient and the offset coefficient corresponding to each pixel in the pixel array;
- providing an offset to the pixel signals in the analog domain, wherein the offset for each pixel in the pixel array is determined by the corresponding offset coefficient;
- providing a gain to the pixel signals in the analog domain, wherein the gain for each pixel in the pixel array is determined by the corresponding gain coefficient; and
- converting the gain and offset adjusted pixel signals to digital pixel signals.

28. A method as in claim 27, wherein the first amount and the third amount are the same as one another, and wherein the second amount and the fourth amount are the same as one another.

29. A method as in claim 27, further comprising:
- increasing the gain coefficient by a terminal amount when the difference is less than or equal to the second threshold level; and
- decreasing the gain coefficient by another terminal amount when the difference is less than zero and the absolute value of the difference is less than or equal to the fourth threshold level.

30. A method as in claim 27, wherein the light source has an associated illumination time that is determined according to a process that utilizes the digital pixel signals, and wherein the process comprises:
- selecting a default illumination time (Tinit) for the light source, default offset coefficients, and default gain coefficients at the start of the process;
- finding a peak pixel intensity (PixelMax) from the pixel storage; and
- calculating an illumination time coefficient (Ton) from the peak pixel intensity (PixelMax) and a target white signal level (TargetWhite).

31. A method as in claim 30, wherein the illumination time coefficient is determined by $$Ton = Tinit \times \frac{TargetWhite}{PixelMax}.$$

* * * * *